Sept. 8, 1936. E. A. HORN Re. 20,097

ELECTRICAL CONNECTER

Original Filed March 28, 1931 2 Sheets-Sheet 1

INVENTOR
EMIL A. HORN
by his attorneys
Howson and Howson

Sept. 8, 1936. E. A. HORN Re. 20,097

ELECTRICAL CONNECTER

Original Filed March 28, 1931 2 Sheets-Sheet 2

INVENTOR
EMIL A. HORN
by his attorneys
Howson and Howson

Reissued Sept. 8, 1936

Re. 20,097

UNITED STATES PATENT OFFICE 20,097

ELECTRICAL CONNECTER

Emil A. Horn, Jamaica, N. Y., assignor to Russell & Stoll Company, Inc., New York, N. Y., a corporation of New York Original No. 1,903,715, dated April 11, 1933, Serial No. 526,072, March 23, 1931. Application for reissue October 11, 1934, Serial No. 747,979

10 Claims. (Cl. 173—330)

This application relates to electrical connecters. More particularly it relates to separable electrical connecters which are provided with means for locking the parts together automatically as soon as the contacts become fully engaged. The invention is shown herein as applied to an attachment plug and a receptacle, but it is applicable to connecters generally. It is an object of this invention to provide an electrical connecter with means to lock the two parts of the connecter together automatically. Another object is to simplify the construction of such electrical connecters. Other objects and advantages will appear as it is described in connection with the accompanying drawings.

In the drawings—

Figure 1:
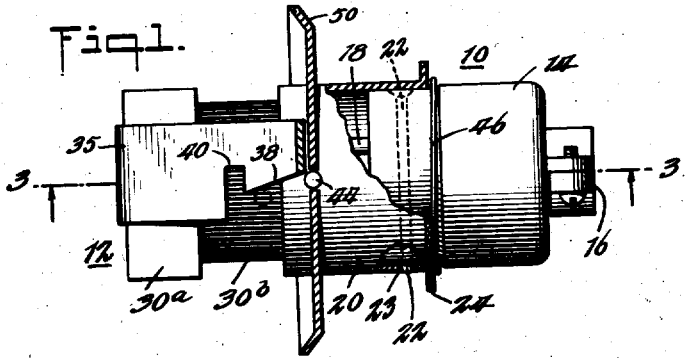
Figure 1 is a broken side elevation view partly in section showing a partially engaged attachment plug and receptacle to which my invention has been applied.
Figure 2:
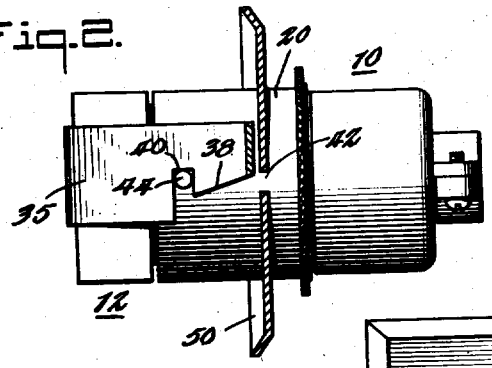
Figure 2 is a view similar to Figure 1 but with the two members of the connecter fully engaged.
Figure 4:
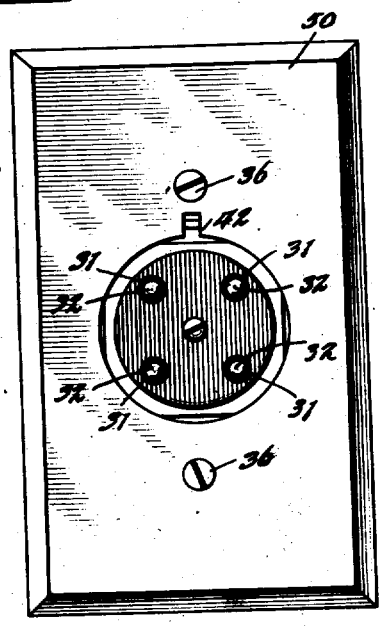
Figure 4 is a front view of the receptacle member and face plate shown in Figure 1.
Figure 3:
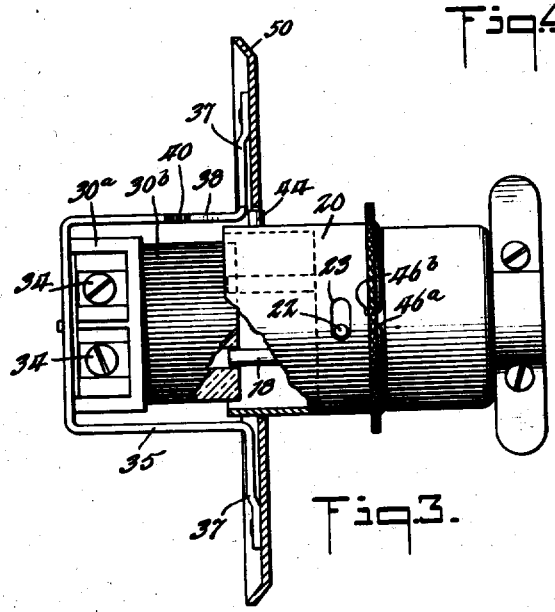
Figure 3 is a section view of the invention as shown in Figure 1 the section being taken on line 3—3 Figure 1.

Referring to the drawings the invention comprises a plug member 10 and a receptacle member 12 which are engageable and detachable from one another by rectilinear movement. The plug member comprises a cylindrical metallic casing 14 closed at one end except for a small aperture through which electrical conductors may pass. The casing is provided, adjacent this small aperture, with a strain relief fitting 16 adapted to grip the electrical conductors and relieve strain upon the contact members of the plug member. Within the plug member is a cylindrical insulating body (not visible) to which are secured pin-type plug contacts 18 which are adapted to cooperate with socket contacts in the receptacle 12. A sleeve member 20 surrounds and projects beyond the end of the plug opposite the strain relief fitting 16. This sleeve member 20 is held upon the metallic casing 14 by the end of the screw 22 which extends radially through the casing 14 and insulating body. The head of the screw 22 is counter-sunk in one side of the casing 14 while the end of the screw extends beyond the casing on the other side into a circumferential slot 23 in the sleeve 20 so that the sleeve is permitted a limited rotational movement upon and relative to the casing 14. To assist the manual rotation of this sleeve a flange 24 is turned out from the inner end of the sleeve and its periphery is knurled.

The receptacle member 12 comprises an insulating body having a rectangular parallelepipedal base 30*a* and a cylindrical portion 30*b*. A plurality of wells 31 are bored in the end of the cylindrical portion in which are located sleeve-like socket contacts 32 which are adapted to receive the plug contacts 18. In opposite side edges of the base portion 30*a* are conventional wire terminals 34 which are connected respectively with the socket contacts 32. The insulating body is seated in a U-shaped strap 35 whose ends 37 are out turned and apertured to receive screws 36 by which a face plate 50 may be secured to the member. The face plate 50 is apertured centrally over the insulating body portion 30*b* in order that the plug 10 may be projected through the aperture and the plug contacts 18 may engage with the socket contacts 32. One of the legs of the supporting strap of the receptacle is cut away adjacent the out-turned end forming a cam surface 38 beneath which a slot 40 is cut transversely into the leg of the strap. The periphery of the aperture in the face plate 50 is recessed as at 42 adjacent the cam surface 38, in order that a pin 44 which projects radially outward from the sleeve 20 of the plug member may slip through the face plate and engage with the cam surface 38 as the plug is connected with the receptacle. Obviously when the plug starts to engage the receptacle the plug contacts 18 entering the socket wells will prevent the plug from being rotated relative to the receptacle. But, since the sleeve 20 is permitted a limited amount of rotation relative to the plug, the sleeve will be rotated slightly as the pin 44 moves down the cam surface 38 during the movement of the plug to fully engage the plug contacts 18 with the socket contacts 32.

In order to automatically lock the plug to the receptacle when the plug contacts are fully engaged with the socket contacts a spring 46 consisting of a single coil of resilient wire has one end 46a engaged with the casing 14 while its other end 46b is engaged with the flange 24 of the sleeve 20. This spring 46 tends to rotate the sleeve 20 constantly in one direction. Thus as the pin moves down to the end of the cam surface 38, the spring is put under tension by the rotation of the sleeve; and when the pin moves past the end of the cam surface 38 it will slip into the slot 40 by virtue of the effort of the spring in rotating the sleeve. Thus the plug becomes automatically locked to the receptacle.

To disengage the plug from the receptacle the sleeve 20 is rotated against the force of the spring 46 until the pin 44 is outside the slot 40 and then the plug is pulled away from the receptacle and the pin 44 is guided through the recess 42 in the face plate.

Figure 5:
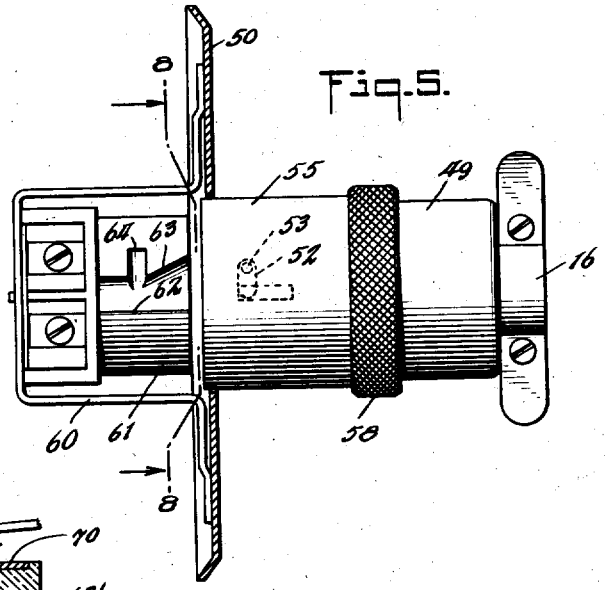
Figure 5 is a side elevation view of a modified form of the invention.

In Figure 5 a modified form of the invention is shown. In this form an insulating body 51 of the plug is secured within the metallic housing 49 by a transverse screw 54 as in the modification heretofore described; and plug contacts 18 are secured to the insulating body as in the previous modification. However, the casing 49 extends beyond the insulating body 51 which it houses and the sleeve 55 which surrounds the casing as in the modification heretofore described terminates at the end of the casing 49. A circumferential slot 52 is formed in the extended end of the casing 49 and into it projects an inwardly directed radial pin 53 mounted on the sleeve. This pin 53 serves to hold the sleeve 55 upon the casing 49 and permits the sleeve to have limited rotational movement upon the casing and relative thereto. The pin extends inwardly beyond the casing a short distance for a purpose which will hereinafter appear.

A spring 57 tends to rotate the sleeve 55 constantly in one direction, one end 57a of the spring being secured in the casing 49 while the other end 57b is secured in a knurled ring 58 formed on the inner end of the sleeve 55 and of slightly greater internal and external diameter than the sleeve. This ring 58 houses the spring and also facilitates rotation of the sleeve 55.

The receptacle member as in the previous modification is mounted in a U-strap 60 to which may be secured a face plate 59 which is apertured to permit the entrance of the plug member, the insulating body 61, having wells 31 and socket contacts 32 with which the plug contacts 18 are engageable as in the modification hereinbefore described. The end portion 61 of the insulating body which contains the socket wells, is cylindrical, as in the prior modification, and of slightly less diameter than the internal diameter of the plug casing 49, in order that this cylindrical portion 61 may slide in the plug casing 49 as the plug and receptacle are connected.

A groove 62 is made in the surface of this cylindrical portion parallel to the axis of the insulating body and a part of the wall of this groove is cut away adjacent the end of the insulating body 61 forming an inclined cam surface 63. At the inner end of the cam surface, a circumferential groove 64, communicating with groove 62, is cut into the insulating body so that when the plug and socket are connected the pin 53 will engage the cam surface and cause the sleeve 55 to be rotated relative to the casing 49 of the plug, the casing being held against rotation by reason of the entry of the plug contacts into the socket wells during the first part of the connecting movement of the plug and receptacle. When the plug and socket contacts become fully engaged, the pin 53 will have passed the inner end of the cam surface 33 and by virtue of the effort of the spring 57 in rotating the sleeve 55, will have entered the circumferential groove 64, thus automatically locking the plug to the receptacle.

Although I have described the grooves cam surface as being cut into the insulating body it is obvious that a metallic sleeve might be formed around the cylindrical portion of the insulating body and the grooves and cam surface formed in that sleeve thereby eliminating any tendency of the pin to wear away the cam surface and grooves.

Figure 9:
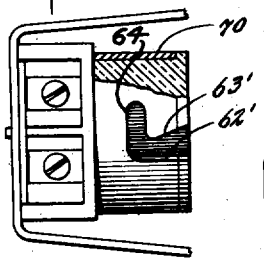
Figure 9 is a view similar to Figure 5 but of a modified form of the construction shown in that figure.
Figure 6:
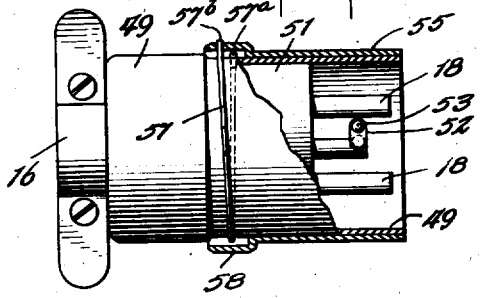
Figure 6 is a side view of the plug member used in the modification of the invention as shown in Figure 5.
Figure 7:
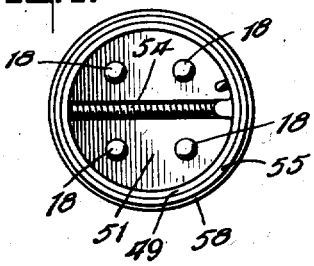
Figure 7 is an end view of the plug member in Figure 6.
Figure 8:
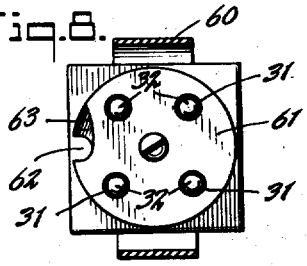
Figure 8 is a section view of the receptacle member shown in Figure 5 the section taken on line 8—8 of Figure 5.

Such a construction is shown in Figure 9 wherein the sleeve 70 has slots 62', 64' and cam surface 63' corresponding to the slots 62, 64 and cam surface 63 in the modification just described.

To remove the plug from the receptacle it is necessary simply to rotate the sleeve 55 against the action of the spring 57 until the pin 53 has moved out of the circumferential groove 64 and then the plug may be removed from the receptacle by pulling it away therefrom.

Many modifications within the scope of my invention will occur to those skilled in the art therefore I do not limit my invention to the modifications shown herewith.

I claim:

1. A separable electric connecter comprising a pair of connectible members, plug and socket contacts thereon, a sleeve located on one of said members and capable of limited rotary motion relative thereto and extending beyond the contacts thereon and terminating in a continuous metal rim at a transverse plane, a pin and slot connection for locking said members together, and a spring urging said sleeve into position in which it holds the parts of said connecter locked together.

2. A separable electric connecter comprising a pair of connectible members, plug and socket contacts thereon, one of said members having an insulating body, a casing around said insulating body and having one end portion rigidly secured thereto, a sleeve mounted on said casing extending beyond the contacts thereon and terminating in a continuous metal rim facing the other member and rotatable to a limited extent with respect thereto, a pin and slot connection between said sleeve and the other of said connectible members for locking said members together, and a spring pressing said sleeve toward locking position.

3. A pair of separable electric connecter members, comprising insulating bodies, plug and socket contacts mounted in said bodies, a metallic housing for one of said bodies, a sleeve around said housing capable of limited rotary movement relative thereto, a pin and slot connection between said sleeve and other of said separable members in combination with a spring pressing said sleeve toward locking position, and a cam surface adjacent said slot whereby said members may be connected by a rectilinear movement and as their contacts become fully engaged said members will become automatically locked together.

4. A separable electric connecter comprising a pair of connectible members having insulating bodies, plug and socket contacts on said bodies, a sleeve on one of said bodies, said sleeve being capable of limited rotary motion relative to said body, a spring tending to rotate said sleeve in one direction relative to said body, a pin and slot connection between said sleeve and the other of said bodies, the slot of said connection having a cam surface whereby said sleeve will be rotated as the members are being connected and will snap into locking position as their contacts become fully engaged.

5. A separable electric connecter comprising a pair of connectible members having insulating bodies, a sleeve on one of said bodies, said sleeve being capable of limited rotary movement relative to said body, a spring tending to rotate said sleeve relative to said body, a member connected with the other insulating body, and a pin and slot connection between said sleeve and said last mentioned member, said slot having a cam surface adjacent thereto engageable by said pin whereby the sleeve will be rotated as the connectible members are joined and will snap into locking position as their contacts become fully engaged.

6. A separable electric connecter comprising a pair of connectible members having insulating bodies, a sleeve on one of said bodies, said sleeve being capable of limited rotary movement relative to said body, a spring tending to rotate said sleeve relative to said body, a supporting strap connected with the other insulating body, and a pin and slot connection between said strap and sleeve, said slot having a cam surface adjacent thereto engageable by said pin whereby the sleeve will be rotated as the connectible members are joined and will snap into locking position as their contacts become fully engaged.

7. An electric connecting device, a receptacle comprising an insulating body, contacts on said body, a face plate, a strap supporting said body from said plate, said plate having an aperture with a radial recess, said contacts being accessible through said aperture, said receptacle having a cam surface adjacent said recess and having a slot at the end of said cam surface, in combination with a plug connectible with said receptacle, said plug comprising an insulating body, a sleeve thereon, said sleeve being capable of limited rotary motion relative to said body, a spring tending to rotate said sleeve relative to said body, and a pin on said sleeve adapted to cooperate with said cam surface and slot and to automatically lock said plug and receptacle together when they are fully connected.

8. A separable electrical connecter comprising insulating bodies having plug and socket contacts thereon, metallic sleeves around said bodies, one of said sleeves being rotatable relatively to said bodies, a spring urging said sleeve in one direction, a pin and slot connection between said sleeve and the sleeve on said other body, a cam surface engageable by said pin to cause rotation of said relatively rotatable sleeve as said contacts are moved towards each other, said spring causing automatic locking of said contacts when said contacts reach fully engaged position.

9. Device as claimed in claim 3, in which said cam surface and the edge of said slot are formed by a single member which is mounted for relative yielding movement with respect to said pin to permit them to pass each other and snap into interlocking engagement.

10. Device as claimed in claim 1, in which each of said connectible members comprises an insulating body carrying its contacts and a metal casing around said insulating body and rigidly secured thereto, and in which said pin and slot connection is between said sleeve and the casing of the other connectible member which also terminates in a continuous metal rim, and the slot comprises a substantially longitudinal groove formed in one of said continuous metal rims and the pin is a radial projection carried by the other and which enters said groove.

EMIL A. HORN.